United States Patent
Osoreda et al.

(10) Patent No.: US 12,161,100 B2
(45) Date of Patent: Dec. 10, 2024

(54) FISHING ROD

(71) Applicant: Shimano Inc., Osaka (JP)

(72) Inventors: Yasuyuki Osoreda, Osaka (JP); Hironori Takahashi, Osaka (JP)

(73) Assignee: Shimano Inc., Osaka (JP)

( * ) Notice: Subject to any disclaimer, the term of this patent is extended or adjusted under 35 U.S.C. 154(b) by 8 days.

(21) Appl. No.: 17/030,892

(22) Filed: Sep. 24, 2020

(65) Prior Publication Data

US 2021/0144982 A1    May 20, 2021

(30) Foreign Application Priority Data

Nov. 15, 2019    (JP) ................................. 2019-207055

(51) Int. Cl.
*A01K 87/08*    (2006.01)

(52) U.S. Cl.
CPC .................................... *A01K 87/08* (2013.01)

(58) Field of Classification Search
CPC ........ A01K 87/08; A01K 87/02; A01K 87/06; A01K 87/00
USPC ............................ 43/23, 22, 18.1 R, 18.1 CT
See application file for complete search history.

(56) References Cited

U.S. PATENT DOCUMENTS

| | | | | |
|---|---|---|---|---|
| 1,033,668 A | * | 7/1912 | Brunnett | A01K 87/08 43/23 |
| 1,113,847 A | * | 10/1914 | Turner | A01K 87/00 43/25 |
| 2,997,042 A | * | 8/1961 | Mitchell | A01K 87/085 126/208 |
| 3,466,783 A | * | 9/1969 | Priebe, Jr. | A01K 87/00 43/18.5 |
| 3,522,674 A | * | 8/1970 | Hardesty | A01K 87/06 43/22 |
| 4,578,890 A | * | 4/1986 | Childre | A01K 87/06 43/20 |
| 4,584,787 A | * | 4/1986 | Aho | A61F 7/034 126/204 |
| 4,601,127 A | * | 7/1986 | Maeda | A01K 87/08 43/18.5 |

(Continued)

FOREIGN PATENT DOCUMENTS

| | | | | |
|---|---|---|---|---|
| JP | | 04117231 A | * | 4/1992 |
| JP | | H04117231 A | * | 4/1992 |

(Continued)

OTHER PUBLICATIONS

JP 2015097541 A Description Translation from Espacenet (Year: 2015).*
Translation of (JP 2015133936 A) to Iwata (Year: 2015).*

*Primary Examiner* — Darren W Ark
*Assistant Examiner* — Katelyn T Truong
(74) *Attorney, Agent, or Firm* — Global IP Counselors, LLP

(57) ABSTRACT

A fishing rod has a rod blank which is configured to be attached a fishing reel on a lower side. The rod blank includes a main portion and a rear grip portion which is continuous to a rod end side of the main portion. The rear grip portion includes a corner portion which is located radially outward and higher relative to an outer perimeter of the main portion, the corner portion being farther from a center of the main portion in a radial direction than a lowermost point of the rear grip portion in a transverse sectional view.

24 Claims, 15 Drawing Sheets

(56) References Cited

U.S. PATENT DOCUMENTS

| | | | | |
|---|---|---|---|---|
| 4,697,376 A | * | 10/1987 | Brackett | A01K 87/08 43/18.1 R |
| 4,817,324 A | * | 4/1989 | Brackett | A01K 87/08 43/18.1 R |
| 4,878,667 A | * | 11/1989 | Tosti | A63B 60/14 473/549 |
| 4,903,427 A | * | 2/1990 | Yamato | A01K 87/00 43/22 |
| 4,916,848 A | * | 4/1990 | Childre | A01K 87/08 43/20 |
| 4,962,608 A | * | 10/1990 | Loomis | A01K 87/00 43/18.1 R |
| 5,337,507 A | * | 8/1994 | Oyama | A01K 87/08 43/22 |
| 5,396,727 A | * | 3/1995 | Furuya | A01K 87/08 43/23 |
| 5,535,539 A | * | 7/1996 | Vetre | A01K 87/08 43/18.1 R |
| 5,832,653 A | * | 11/1998 | Tsurufuji | A01K 87/002 43/24 |
| 2014/0173967 A1 | * | 6/2014 | Iwata | A01K 87/08 43/18.1 R |
| 2014/0366327 A1 | * | 12/2014 | Huang | A01K 87/08 16/421 |

FOREIGN PATENT DOCUMENTS

| | | | | |
|---|---|---|---|---|
| JP | 2517885 Y2 | * | 11/1996 | |
| JP | 2015097541 A | * | 5/2015 | |
| JP | 2015133936 A | * | 7/2015 | |
| JP | 6494568 B2 | | 3/2019 | |
| JP | 2019050745 A | * | 4/2019 | |
| KR | 940002992 Y1 | * | 5/1994 | |
| WO | WO-2019221614 A1 | * | 11/2019 | A01K 87/02 |

* cited by examiner

FISHING ROD

CROSS-REFERENCE TO RELATED APPLICATIONS

This application claims priority to Japanese Patent Application No. 2019-207055, filed on Nov. 15, 2019. The entire disclosure of Japanese Patent Application No. 2019-207055 is hereby incorporated herein by reference.

BACKGROUND

Field of the Invention

The present invention relates to a fishing rod that includes a rear grip portion.

Background Art

A conventional fishing rod includes a rear grip portion at the rod end side of the fishing rod relative to a reel seat. In this conventional fishing rod, the rear grip portion is separate from a rod blank that forms a part of the rod. That is, the rear grip portion is placed on the outer periphery of the rod blank. For example, when an angler holds the fishing rod with their right hand, the angler can place their right arm on the rear grip portion when a fish is caught. Thus, the angler can support the fishing rod with their right hand and their right arm.

Additionally, one configuration includes a rear grip portion that is integrally formed with the rod blank, as shown in Japanese Patent No. 6494568. When the rear grip portion is integrally formed with the rod blank in this way, the sensitivity transmitted from the fishing rod to the hand is improved.

One configuration of a fishing rod includes a rear grip portion that has a non-circular cross-sectional shape and the rear grip portion is offset towards the lower side, as shown in Japanese Laid-Open Patent Application No. 2019-50745 below. Since the cross-sectional shape of the rear grip portion is non-circular, it is possible for the right arm to stably abut on the upper surface of the rear grip portion. Also, it is possible to easily grasp the orientation of the fishing rod in the circumferential direction by feel of the left hand that holds the rear grip portion.

SUMMARY

It has been found that conventional fishing rods have drawbacks and an improved rear grip portion is desired. For example, when the rear grip portion is separate from the rod blank, the sensitivity transmitted from the fishing rod to a hand is decreased. Additionally, when the rear grip portion is integrally formed with the rod blank, the cross-sectional shape of the rear grip portion is circular, and the rear grip portion tends to rotate in the circumferential direction when the rear grip portion abuts the right arm. Also, some anglers hold the rear grip portion with the left hand and double-handed cast. If the cross-sectional shape of the rear grip portion is circular, it is difficult to grasp the rear grip portion of the fishing rod in the circumferential direction by feel with the left hand. Further, in the conventional rods when the rear grip portion is offset towards the lower side, it is difficult to place the left arm on the upper surface of the rear grip portion if the rod blank is relatively thin.

An object of the present invention is to provide a fishing rod with high sensitivity, that is capable of easily preventing or reducing rotation of the fishing rod in the circumferential direction and includes a rear grip portion suitable for a thin rod blank.

Thus, a fishing rod according to the present invention has a rod blank. A reel can be attached to the lower side of the rod blank. The rod blank has a main portion and a rear grip portion at the rod end side relative to the reel. The rear grip portion is continuous to the rod end side of the main portion. The rear grip portion has a corner portion. The corner portion is located radially outward and higher relative to the outer perimeter of the main portion. The corner portion is farther from the center of the main portion in the radial direction than the lowermost point of the rear grip portion in a transverse sectional view. As can be understood, a transverse sectional view is a cross-sectional view taken when cut in a direction orthogonal to the centerline of the fishing rod.

According to this configuration, the reel is attached to the lower side of the rod blank. The reel can be a spinning reel, for example, and be positioned on the lower side of the fishing rod. When the fishing rod is held by the right hand, for example, the fishing rod can be supported by placing the right arm (including the elbow) on the rear grip portion. The rear grip portion has a corner portion located radially outward and higher relative to the outer perimeter of the main portion. As such, even if the main portion of the rod blank is relatively thin, it is possible to easily place the right arm on the rear grip portion so as to easily stabilize the fishing rod with the right hand. Additionally, the corner portion is farther from the center of the main portion in the radial direction than the lowermost point of the rear grip portion in the transverse sectional view. Therefore, the rear grip portion is unlikely to rotate in the circumferential direction with respect to the right arm. It is possible to easily suppress the wobbling of the fishing rod in the circumferential direction. Additionally, since the rear grip portion includes the corner portion, when double-handed casting is performed by holding the rear grip portion with the left hand, the left hand can easily grasp the proper orientation of the fishing rod in the circumferential direction. As such, when performing double-handed casting, the fishing rod can be easily aligned in a predetermined direction and the casting can be accurately performed. Also, the left hand is unlikely to be displaced on the rear grip portion in the circumferential direction due to the corner portion. Thus, it is possible to hold the rear grip portion and to cast without significant force.

A fishing rod according to an embodiment of the present invention has a rod blank. A reel can be attached to the upper side of the rod blank. The rod blank has a main portion and a rear grip portion at the rod end side relative to the reel. The rear grip portion is continuous to the rod end side of the main portion. The rear grip portion has a corner portion located radially outward and higher relative to the outer perimeter of the main portion. The corner portion is farther from the center of the main portion in the radial direction than the lowermost point of the rear grip portion in a transverse sectional view.

According to this embodiment, the reel can be a double bearing reel, for example, and can be positioned on the upper side of the rod blank of the fishing rod. When the fishing rod is held by the right hand, for example, the fishing rod can be supported by placing the right arm (including the elbow) on the rear grip portion. The corner portion of the rear grip portion is located radially outward and higher relative to the outer perimeter of the main portion. As such, even if the main portion of the rod blank is relatively thin, it is possible to easily place the right arm on the rear grip portion so as to easily stabilize the fishing rod with the right hand. Additionally, the corner portion is farther from the center of the main portion in the radial direction than the lowermost point of the rear grip portion in the transverse sectional view. Therefore, the rear grip portion is unlikely to rotate in the circumferential direction with respect to the right arm. It is possible to easily prevent or reduce the wobbling of the fishing rod in the circumferential direction. Additionally, since the rear grip portion includes a corner portion, when double-handed casting is performed by holding the rear grip portion with the left hand, the left hand can easily grasp the proper orientation of the fishing rod in the circumferential direction. As such, when performing double-handed casting, the fishing rod can be easily aligned in a predetermined direction and the casting can be accurately performed. Also, the left hand is unlikely to be displaced on the rear grip portion in the circumferential direction due to the corner portion. Thus, it is possible to hold the rear grip portion and to cast without significant force.

Preferably, the rear grip portion has the corner portion which has at least two corners, a first corner and a second corner, and an upper surface and a lower surface. The upper surface is the surface on the upper side of the circumference between the first corner and the second corner. The lower surface is the surface on the lower side of the circumference between the first corner and the second corner. The upper surface and the lower surface have different radial of curvature in a transverse sectional view. According to this configuration, the rotation of the fishing rod in the circumferential direction can be easily prevented or reduced.

Preferably, the radius of curvature of the upper surface in the circumferential direction is larger than the radius of curvature of the lower surface in the circumferential direction. The upper surface is an approximate plane surface. According to this configuration, the rotation of the fishing rod in the circumferential direction can be easily ed or reduced.

Preferably, the radius of curvature of the upper surface in the circumferential direction is larger than the radius of a virtual circle passing through the first corner and the second corner, with the centerline of the main portion as the center. According to this configuration, it is possible to reliably place the right arm on the upper surface, and thus, the rotation of the fishing rod in the circumferential direction can be easily prevented or reduced.

Preferably, the end surface of the rod blank on the rod end side is inclined so that the lower side is more on the rod end side than the upper side. According to this configuration, the lower portion of the rear grip portion extends more towards the rod end side than the upper portion. The rear grip portion is held by the left hand when casting. In this situation, the left thumb is placed on the upper portion of the rear grip portion, for example, and all or a part of the fingers of the remaining four fingers of the left hand are placed on the lower portion of the rear grip portion. Since the lower portion of the rear grip portion extends more towards the rod end side than the upper portion, it is possible to place many fingers on the lower portion of the rear grip portion. Thus, the rear grip portion can be shortened, and the weight can be reduced.

Preferably, the rear grip portion has a larger expansion amount towards the upper side than the expansion amount towards the lower side at least in the rod end side portion. According to this configuration, even if the main portion of the rod blank is relatively thin, the right arm can be easily placed on the rear grip portion.

Preferably, the fishing rod has an end cap. The end cap is attached to the end of the rod blank on the rod end side. The end surface of the end cap on the rod end side is inclined so that the lower side is more on the rod end side than the upper side. According to this configuration, the fishing rod can be smoothly inserted into a rod holder or a fishing rod bag. Additionally, it is possible to easily grasp the orientation of the fishing rod in the circumferential direction, due to the end surface of the end cap on the rod end side.

Preferably, the end cap has a guard wall which projects to the rod end side at least in the lower portion of the periphery of the end surface of the end cap on the rod end side. The projection amount of the guard wall gradually increases towards the lower side. According to this configuration, the guard wall can effectively protect the lower portion of the end surface of the rod blank on the rod end side and also the lower portion of the end cap.

Preferably, the end cap has a cylinder part inserted inside of the rod blank. The end surface of the cylinder part on the rod end side is inclined so that the lower side is more on the rod end side than the upper side. According to this configuration, the rod blank is supported by the cylinder part and damage to the rod blank can be prevented. Also, it is possible to reduce the weight of the cylinder part.

As described above, with the embodiments of the present invention, it is possible to provide a fishing rod with high sensitivity and that easily prevents or reduces the rotation of the fishing rod in the circumferential direction and it is particularly suitable for a thin rod blank.

DETAILED DESCRIPTION OF EMBODIMENTS

Figure 1:
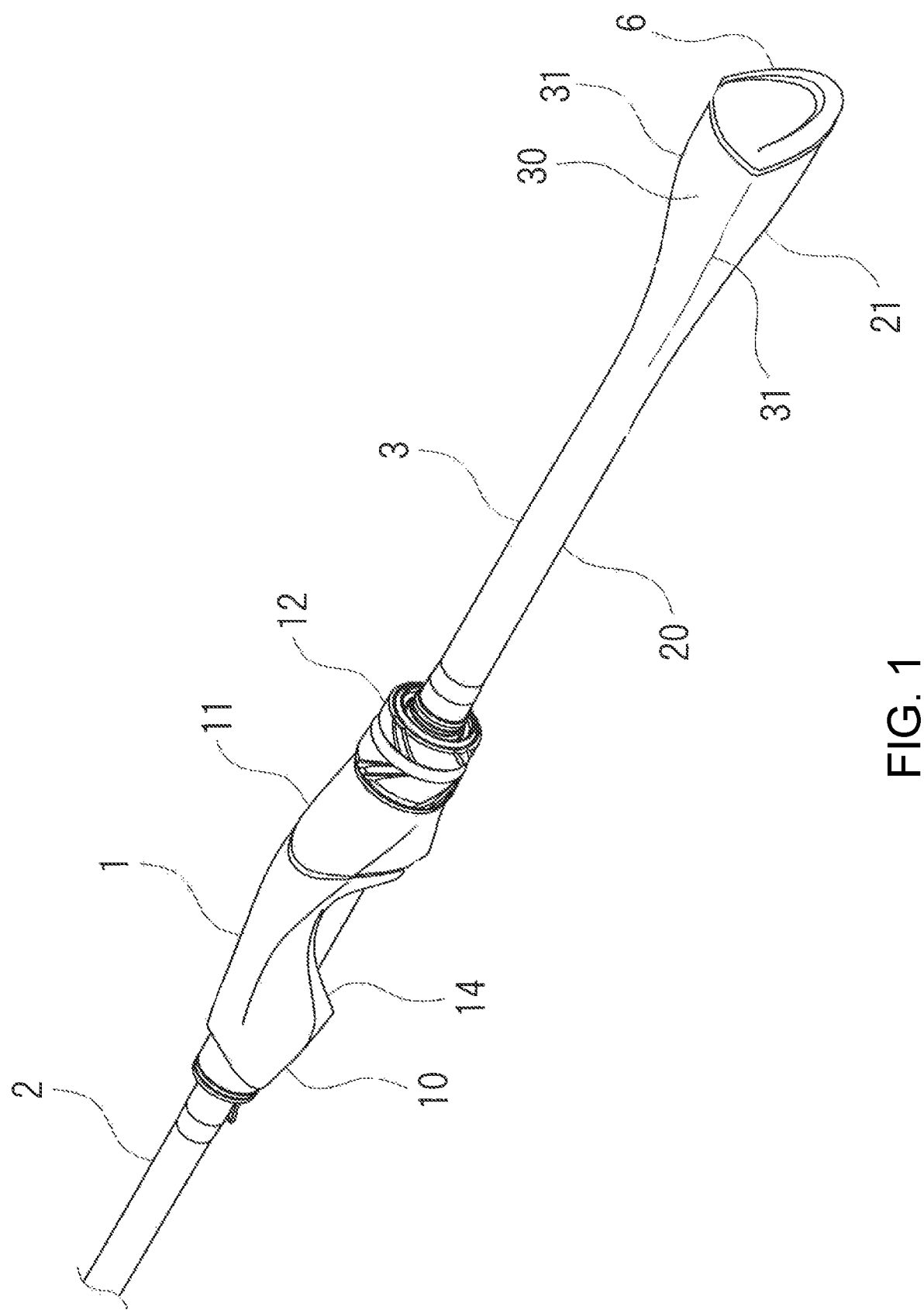
FIG. 1 is a perspective view showing the relevant part of a fishing rod in one embodiment of the present invention.
Figure 2:
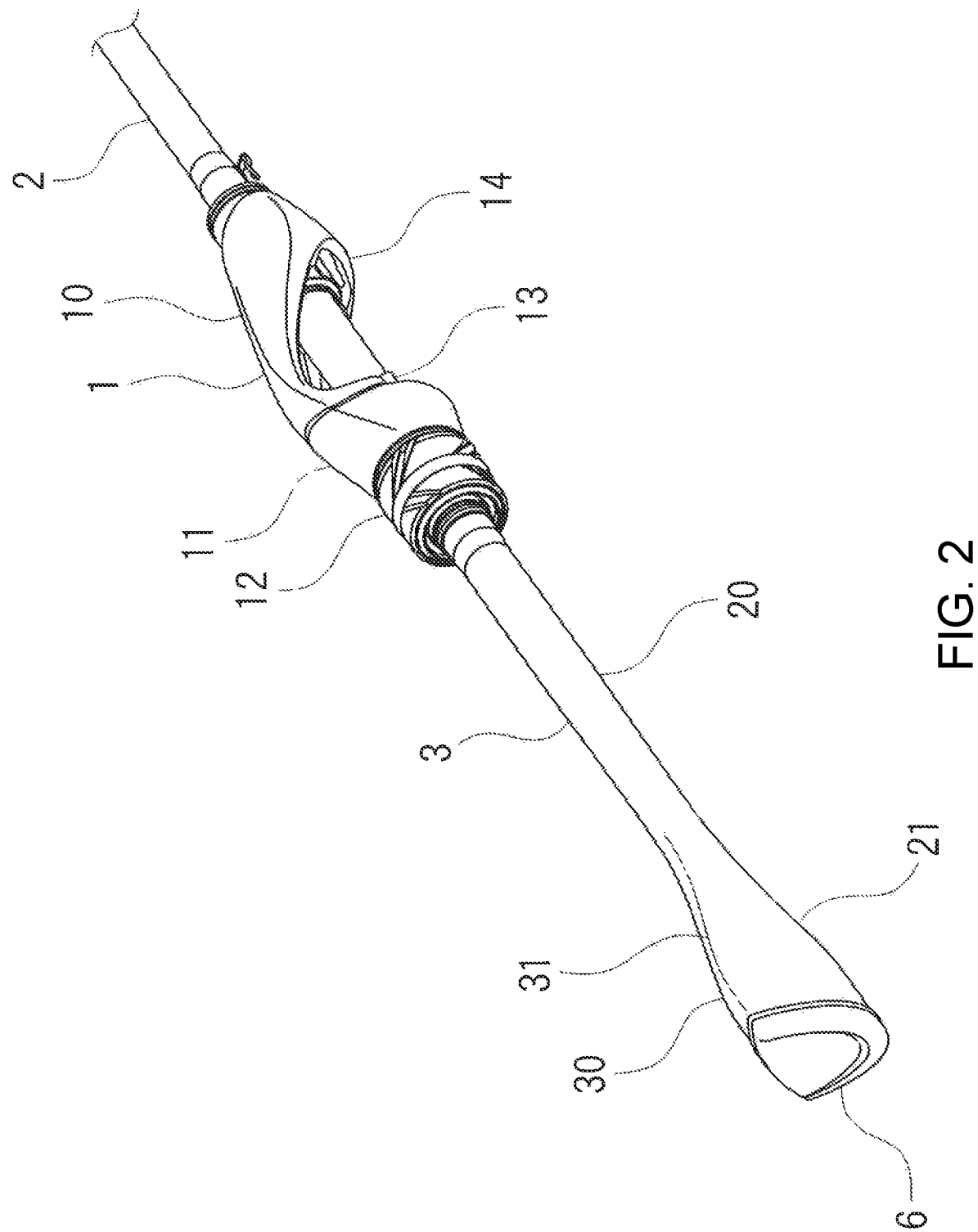
FIG. 2 is a perspective view showing the relevant part of the fishing rod.
Figure 3:
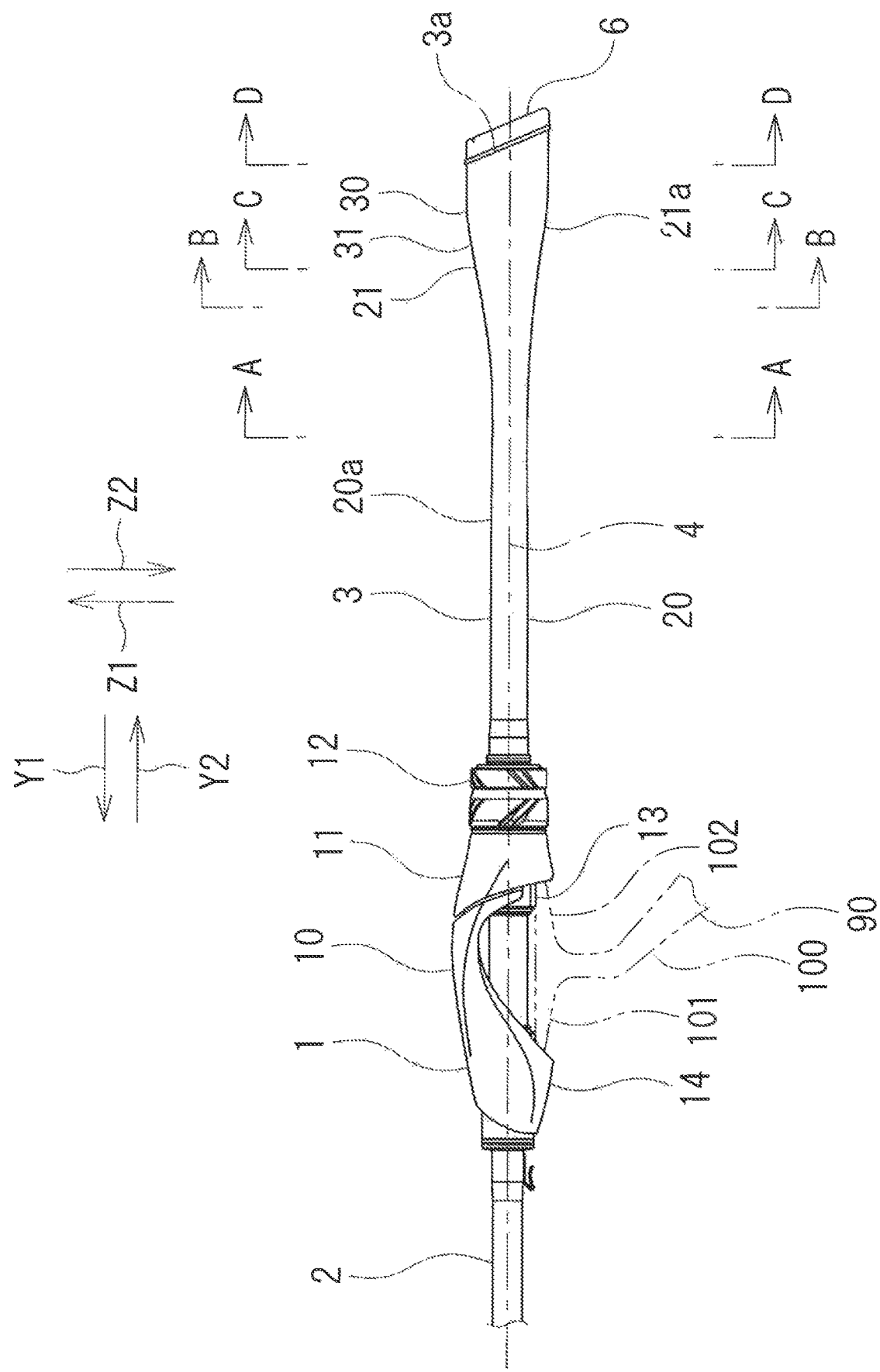
FIG. 3 is a front view showing the relevant part of the fishing rod.

A fishing rod according to one embodiment of the present invention will be described below with reference to FIGS. 1 to 14B. The type of the fishing rod can be any suitable fishing rod, for example the fishing rod can be a connecting rod, a telescopic rod, a one-piece rod and such. As shown in FIGS. 1-3, the fishing rod according to this embodiment has a rod body and a reel seat 1. The reel seat 1, in the present embodiment, is mounted on the rod body and is suitable for and configured to have a spinning reel 90 attach thereto. The spinning reel 90 includes a reel leg 100 for attaching the spinning reel 90 to the reel seat 1. The reel leg 100 has a first leg part 101 and a second leg part 102. The reel seat 1 has a reel mounting surface 13 to which the reel leg 100 is attached. The rear surface of the reel leg 100 abuts the reel mounting surface 13. The spinning reel 90 is located on the lower side of the fishing rod and the reel mounting surface 13 faces down when the spinning reel 90 is in use and attached to the fishing rod. In the embodiment in which the spinning reel 90 is used, the lower side is the reel mounting side and the upper side is the opposite side of the reel mounting side in the radial direction.

Figure 4:
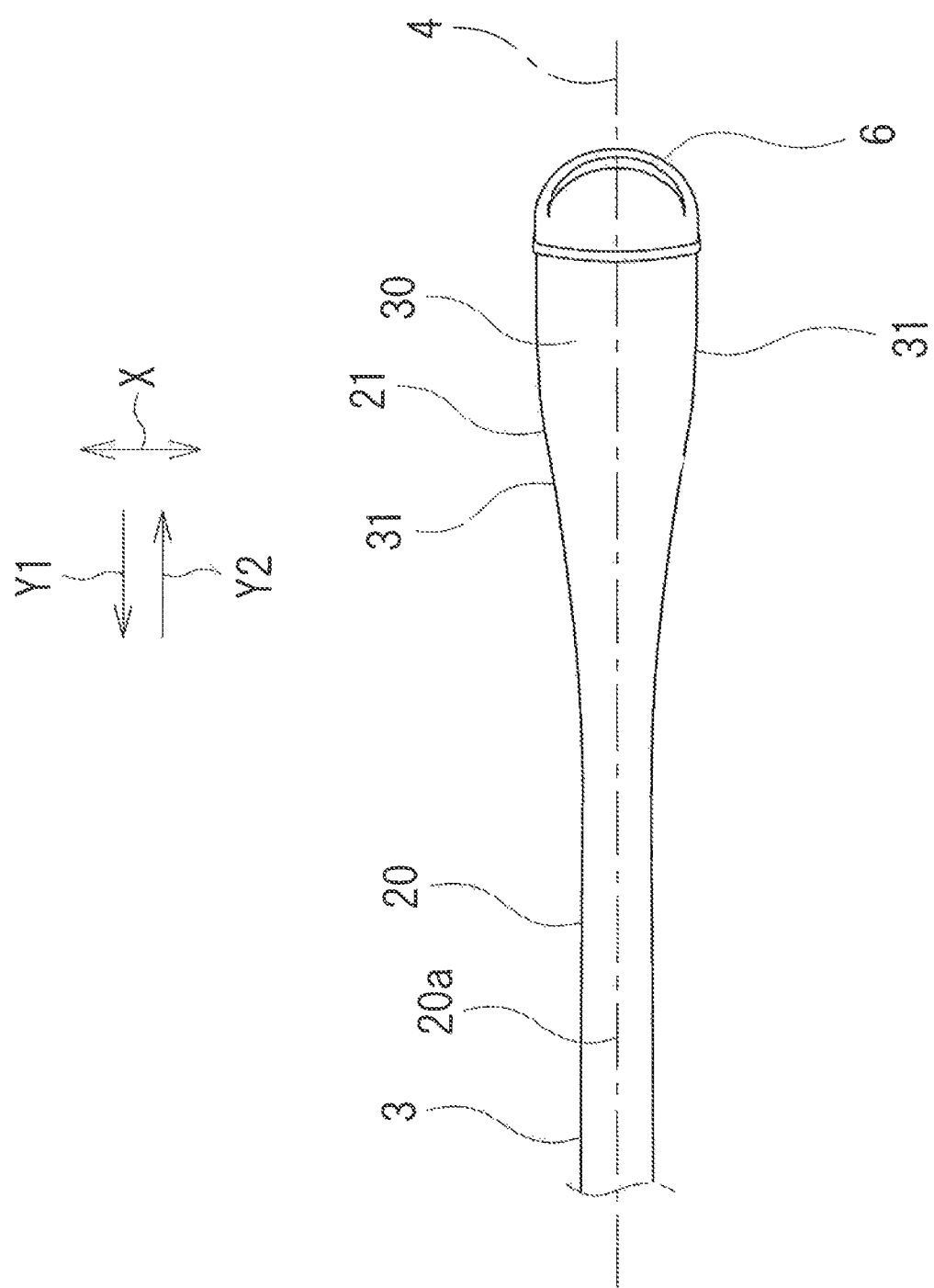
FIG. 4 is a plan view showing the relevant part of the fishing rod.

The direction of the centerline of the fishing rod is the longitudinal direction and the rod tip side is the front side and the rod end side is the rear side. The side of the reel mounting surface 13 is the lower side and the opposite side of the reel mounting surface 13 in the radial direction is the upper side. FIG. 4 is a plan view of the fishing rod viewed from the upper side. When viewing the fishing rod from the upper side, the direction orthogonal to the longitudinal direction is the right-and-left direction. In the figures, the right-and-left direction is shown with the arrow X, the front side is shown with the arrow Y1, the rear side is shown with the arrow Y2, the upper side is shown with the arrow Z1 and the lower side is shown with the arrow Z2.

The reel seat 1 is tubular and is attached to the rod body, generally by inserting the rod body into the seal seat 1. The reel seat 1 can also be referred to as a pipe seat. The reel seat 1 is immovably fixed at a predetermined position of the rod body by attaching the reel seat 1 to the outer periphery of the rod body directly or via a tubular spacer.

The reel seat 1 includes a reel seat body 10, a movable hood 11 and a nut 12. The rod body is inserted into the reel seat body 10. The reel seat body 10 has the reel mounting surface 13 and a fixed hood 14 The fixed hood 14 is integrally formed with the reel seat body 10. The first leg part 101 of the reel leg 100 faces the front side and the second leg part 102 faces the rear side in the state in which the spinning reel 90 is attached to the reel seat 1. The fixed hood 14 holds the first leg part 101 of the reel leg 100. The movable hood 11 is movable in a back-and-force direction relative to the reel seat body 10. The movable hood 11 holds the second leg part 102 of the reel leg 100. The nut 12 is screwed on the reel seat body 10. The nut 12 moves the movable hood 11 in the back-and-force direction and fixes the movable hood 11 at the desired position. In this embodiment, the nut 12 is located on the rear side of the reel seat body 10. However, the nut 12 can be located on the front side of the reel seat body 10.

The rod body comprises one rod blank or a plurality of rod blanks (rod body). In this embodiment, the rod body includes a first rod blank 2 and a second rod blank 3. The first rod blank 2 is located on the front side of the second rod blank 3. The first rod blank 2 and the second rod blank 3 are integrally joined to each other. For example, the first rod blank 2 and the second rod blank 3 are joined to each other, inside of the reel seat body 10. The first rod blank 2 and the second rod blank 3 are joined to form an overlapping portion which has a predetermined length, for example. Meanwhile, the first rod blank 2 and the second rod blank 3 can be detachably connected to each other.

The second rod blank 3 is formed in a hollow shape by winding prepreg on a mandrel and firing. Carbon fiber or glass fiber may be used as reinforcing fiber of the prepreg. The second rod blank 3 extends from the reel seat 1 towards the rear side. The second rod blank 3 extends to the rear end of the fishing rod. The second rod blank 3 has a main portion 20 and a rear grip portion 21. The main portion 20 and the rear grip portion 21 are integrally formed with the second rod blank 3. The front portion of the main portion 20 is located inside of the reel seat 1. The main portion 20 extends from the reel seat 1 towards the rear side. The main portion 20 is a cylinder. The centerline 4 of the main portion 20 is the centerline of the second rod blank 3 and the centerline of the fishing rod. The surface orthogonal to the centerline 4 of the main portion 20 is referred to as an orthogonal plane. The normal line of the orthogonal plane is the centerline 4 of the main portion 20. The orthogonal plane is orthogonal to the longitudinal direction. The cross-sectional surface in which the second rod blank 3 is cut along the orthogonal plane is referred to as a transverse sectional surface and the cross-sectional shape is referred to as a transverse sectional shape. The transverse sectional shape of the main portion 20 is a circular shape. The main portion 20 preferably has a straight shape with a substantially constant diameter.

The rear grip portion 21 is continuous to the rear side of the main portion 20. The arm of the hand holding the fishing rod can be placed on the rear grip portion 21 or the rear grip portion 21 can be held with the opposite hand from the hand holding the reel seat 1 when casting with both hands. In the following, the situation in which the fishing rod is held with the right hand will be described as an example. When holding the fishing rod with the right hand, the right arm (including the elbow) is placed on the rear grip portion 21. When casting with both hands, i.e., when performing double-handed casting, the right hand holds the reel seat 1 and the left hand holds the rear grip portion 21.

The rear grip portion 21 extends to the rear end of the second rod blank 3. The rear grip portion 21 is thicker than the main portion 20. In other words, the rear grip portion 21 expands radially further than the main portion 20. The rear grip portion 21 is spaced apart from the reel seat 1 to the rear side. In this embodiment, the rear grip portion 21 is shorter than the main portion 20. The length of the rear grip portion 21 is long enough for the left hand to hold. The length of the rear grip portion 21 is preferably a length that corresponds to at least three or more fingers among the four fingers from the index finger to the little finger of a general size hand of an adult.

The transverse sectional shape of the rear grip portion 21 is a non-circular shape. The rear grip portion 21 to increasingly gradually expands towards the rear side. The rear grip portion 21 has an expanded section which continues from the rear side of the main portion 20 and gradually expands towards the rear side and a straight section which continues to the rear side of the expanded section, extends up to the rear end of the rear grip portion 21 and maintains a constant shape without expanding towards the rear side. An end cap 6 which will be described later, is attached to the straight section. It is preferable for the rear grip portion 21 to have a straight section. However, the straight section can be omitted.

Figure 9A:
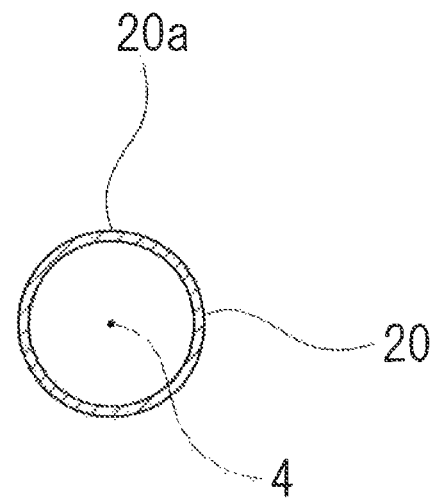
FIG. 9A is a cross sectional end elevational view along lines A-A of FIG. 3.
Figure 9B:
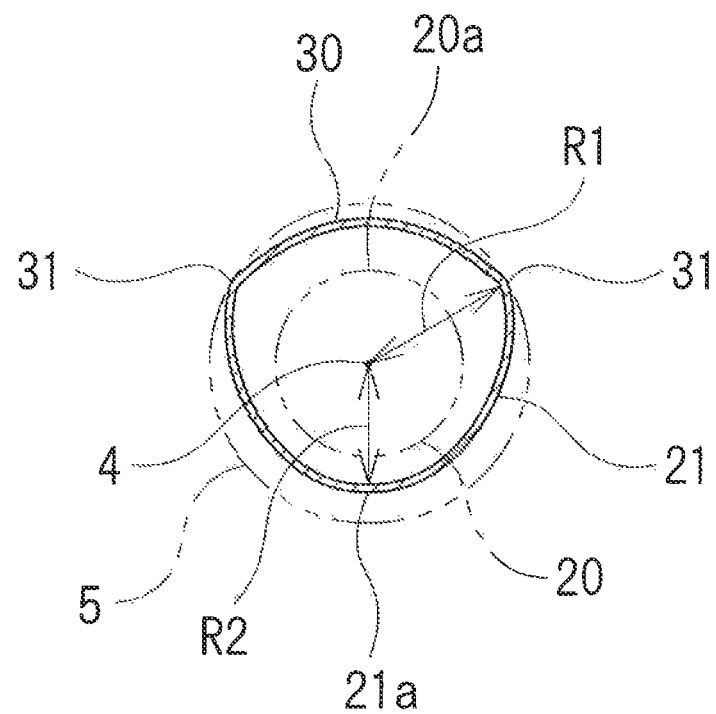
FIG. 9B is a cross sectional end elevational view along lines B-B of FIG. 3.
Figure 10A:
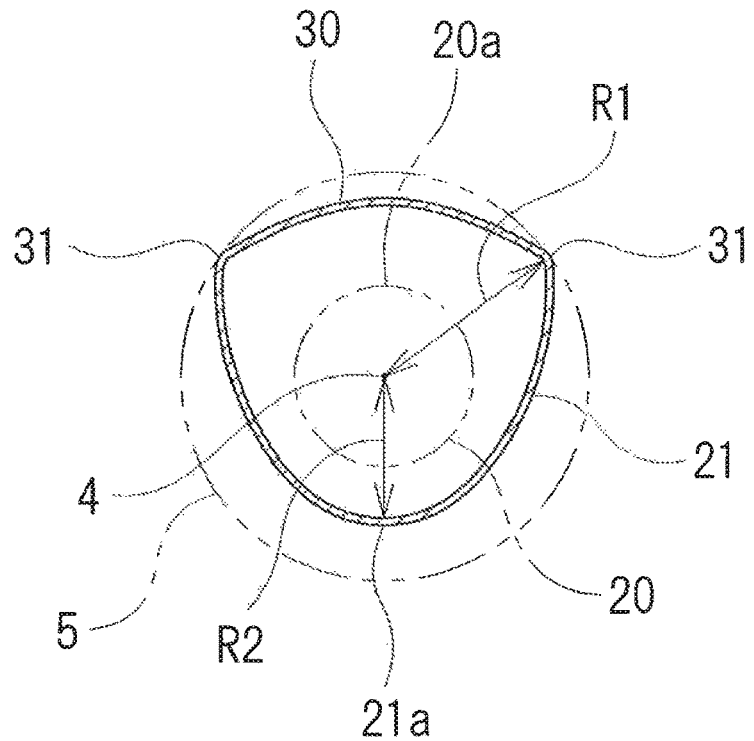
FIG. 10A is a cross sectional end elevational view along lines C-C of FIG. 3.
Figure 10B:
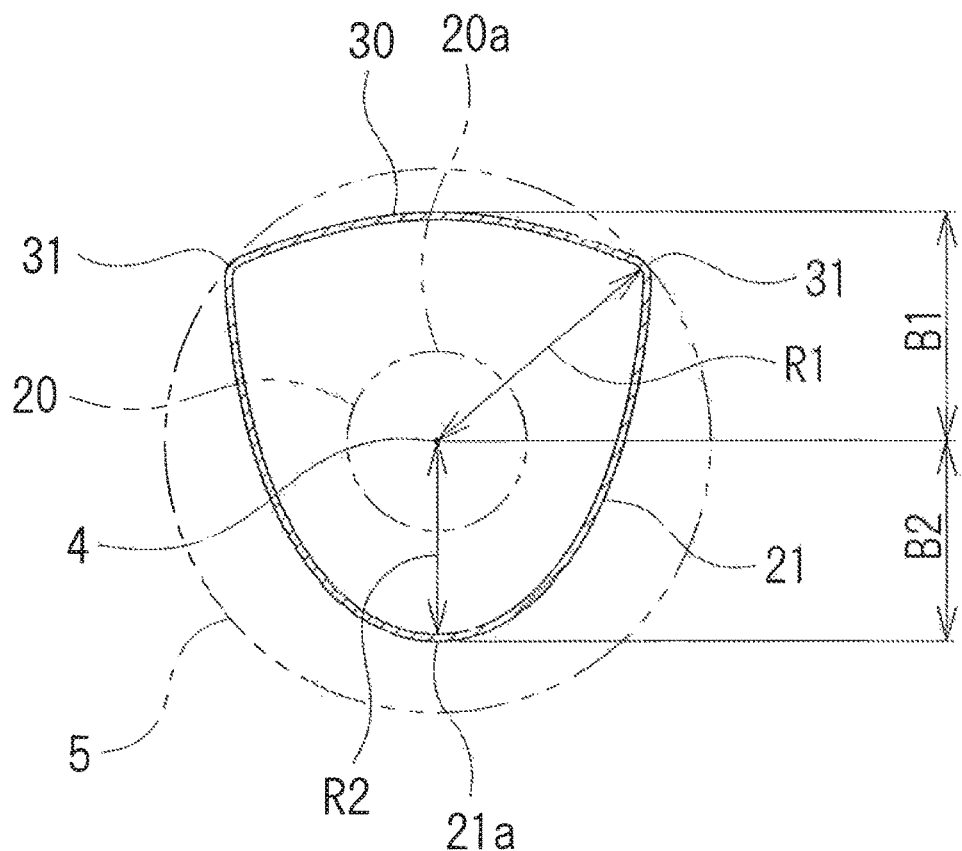
FIG. 10B is a cross sectional end elevational view along lines D-D of FIG. 3.

The transverse sectional shape of the rear grip portion 21 is shown in FIGS. 9B, 10A and 10B. In FIGS. 9B, 10A and 10B, the outer periphery of the main portion 20 is indicated by a chain double-dashed line and a virtual circle 5 with a radius that is the distance R1 between the centerline 4 of the main portion 20 and the both of the left and right corners 31, is indicated by a chain double-dashed line. The FIG. 9A shows the transverse sectional shape of the main portion 20. As mentioned above, the transverse sectional shape of the main portion 20 is circular. On the other hand, the transverse sectional shape of the rear grip portion 21 is not a circular shape but a bilaterally symmetrical non-circular shape. In detail, the transverse sectional shape of the rear grip portion 21 is an inverted triangle. The transverse sectional shape of the second rod blank 3 transforms from a circular shape to an inverted triangular shape from the main portion 20 to the rear trip section 21. As shown in FIG. 10B, the expansion amount B1 towards the upper side is larger than the expansion amount B2 towards the lower side at least on the rear portion of the rear grip portion 21.

The rear grip portion 21 includes a pair of left and right corners 31, an upper surface 30 and a lower surface. In this embodiment, the rear grip portion 21 has a pair of left and right corners 31, however, the rear grip portion 21 can have only one corner 31. Since a pair of left and right corners 31 are disposed on the rear grip portion 21, the entire circumference of the rear grip portion 21 is divided into two sections in the circumferential direction. The upper portion of the divided sections is the upper surface 30 and the lower portion is the lower surface. The lower surface is the section where the upper surface 30 is omitted from the entire circumference of the rear grip portion 21. The upper surface 30 is located between the pair of left and right corners 31 and positioned in the upper side of the circumference of the rear grip portion 21. The lower surface is located between the pair of the left and right corners 31 and positioned in the lower side of the circumference of the rear grip portion 21. The radius of curvature of the upper surface 30 in the circumferential direction is preferably different from the radius of curvature of the lower surface in the circumferential direction. The radius of curvature of the upper surface 30 in the circumferential direction is preferably larger than the radius of curvature of the lower surface in the circumferential direction.

The upper surface 30 is the upper surface of the rear grip portion 21. The corners 31 are formed respectively on both ends of the upper surface 30 in the circumferential direction. The arm of the hand holding the fishing rod, that is, the right hand can be placed on the upper surface 30. In the planar view such as FIG. 4, the upper surface 30 is wider than the diameter of the main portion 20. The upper surface 30 gradually widens towards the rear side. As shown in FIG. 3, the upper surface 30 also gradually rises towards the rear side. As shown in FIGS. 9B, 10A and 10B, the upper surface 30 is a convex curved surface which is curved radially outward along the circumferential direction. The radius of curvature of the upper surface 30 in the circumferential direction is larger than the radius of the virtual circle 5 passing the pair of corners 31 with the centerline 4 of the main portion 20 as the center. The radius of curvature of the upper surface 30 in the circumferential direction is large and the upper surface 30 is a curved surface which is close to a plane and is an approximate plane surface. The radius of the curvature of the upper surface 30 in the circumferential direction is larger than the radius of the virtual circle 5. As shown in FIGS. 10A and 10B, the upper surface 30 is located upper than the top 20a of the main portion 20 at least on the rear portion of the rear grip portion 21.

The corner 31 is the portion where the radius of curvature in the circumferential directions is locally small. The radius of curvature of the corner in the circumferential direction is the smallest of the entire circumference of the rear grip portion 21. The corner 31 is a streak that extends from the front side to the rear side. In the planar view, the corners 31 are located on the end portions in the right-and-left direction. The distance between both corners 31 is the size and the width of the rear grip portion 21 in the right-and-left direction. The distance between both corners 31 gradually increases towards the rear side. The outer periphery of the rear grip portion 21 is vertically separated by the left and right corners 31. Among the two portions of the outer periphery of the rear grip portion 21, that are vertically separated by the left and right corners 31, the upper portion is the upper surface 30. The rear grip portion 21 has a shape in which the width gradually decreases from the pair of corners 31 to the lowermost point 21a of the rear grip portion 21. The transverse sectional shape of the rear grip portion 21 is an inverted triangle. The lowermost point 21a of the rear grip portion 21 is the vertex of the lower side of the inverted triangle. In a transverse sectional view, the lowermost point 21a of the rear grip portion 21 has a distance R2 from the centerline 4 of the main portion 20 to the lowermost point 21a of the rear grip portion 21.

As shown in FIGS. 10A and 10B, the pair of corners 31 is located radially outward and higher relative to the top 20a of the main portion 20 at least in the rear portion of the rear grip portion 21. The virtual circle 5 is larger than the outer periphery of the main portion 20. In the transverse sectional view, the diameter of the virtual circle 5 is larger than the outer diameter of the main portion 20. In the rear portion of the rear grip portion 21, the diameter of the virtual circle 5 is at least more than twice the outer diameter of the main portion 20. Additionally, as in FIGS. 9B, 10A and 10B, in the transverse sectional view, the pair of corners 31 is most distant from the centerline 4 of the main portion 20 in the radial direction out of entire circumference of the rear grip portion 21. In the transverse sectional view, the distance R1 (radius) from the centerline 4 of the main portion 20 to the pair of corners 31 is larger than the distance R2 (radius) from the centerline 4 of the main portion 20 to the lowermost point 21a of the rear grip portion 21. The distance R1 from the centerline 4 of the main portion 20 to the pair of corners 31 is the radius of the virtual circle 5. The radius of the virtual circle 5 is larger than the distance R2 from the centerline 4 of the main portion 20 to the lowermost point 21a of the rear grip portion 21. Over the entire length of the rear grip portion 21, the pair of corners 31 are most distant from the centerline 4 of the main portion 20 of the entire circumference of the rear grip portion 21 in the radial direction.

A rear end surface 3a of the second rod blank 3 can be parallel to the orthogonal plane. However, in this embodiment, the rear end surface 3a of the second rod blank 3 is inclined in relative to the orthogonal plane. That is, the rear end surface 3a of the second rod blank 3 is an inclined surface. The rear end surface 3a of the second rod blank 3 is inclined so that the lower side is farther rearward than the upper side. In the following, the inclined angle relative to the orthogonal plane is simply referred to as an inclined angle. The inclined angle θ1 of the rear end surface 3a of the second rod blank 3 is, for example, 45 degrees or less.

End Cap 6

Figure 5:
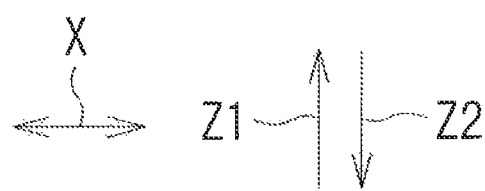
FIG. 5 is a view of the fishing rod from the rod end side.
Figure 5:
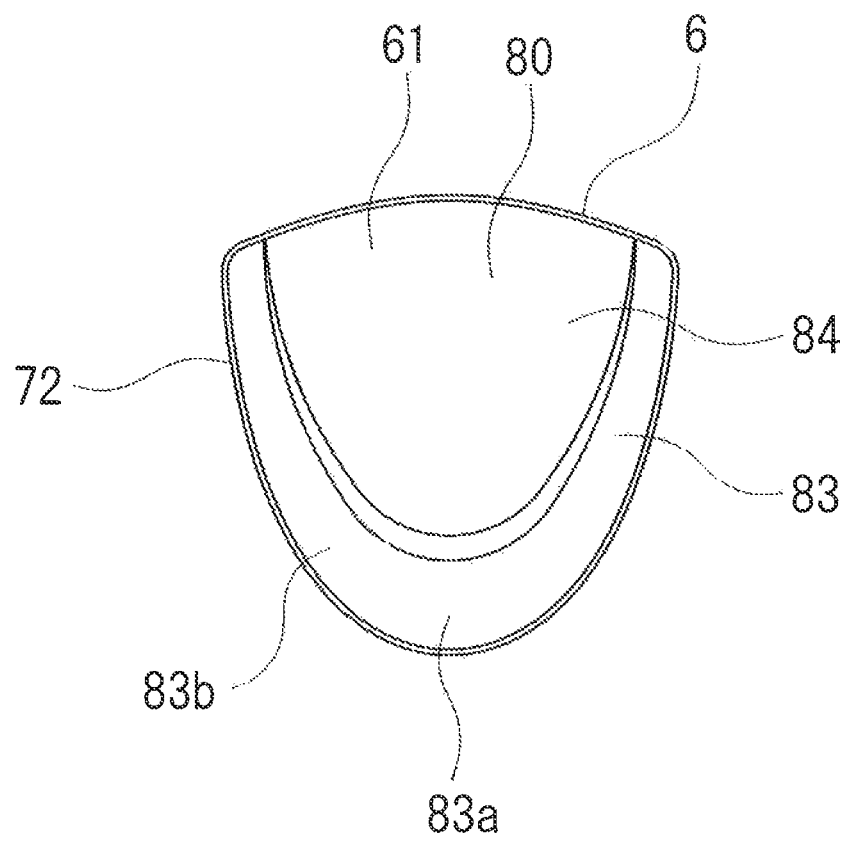
Figure 6:
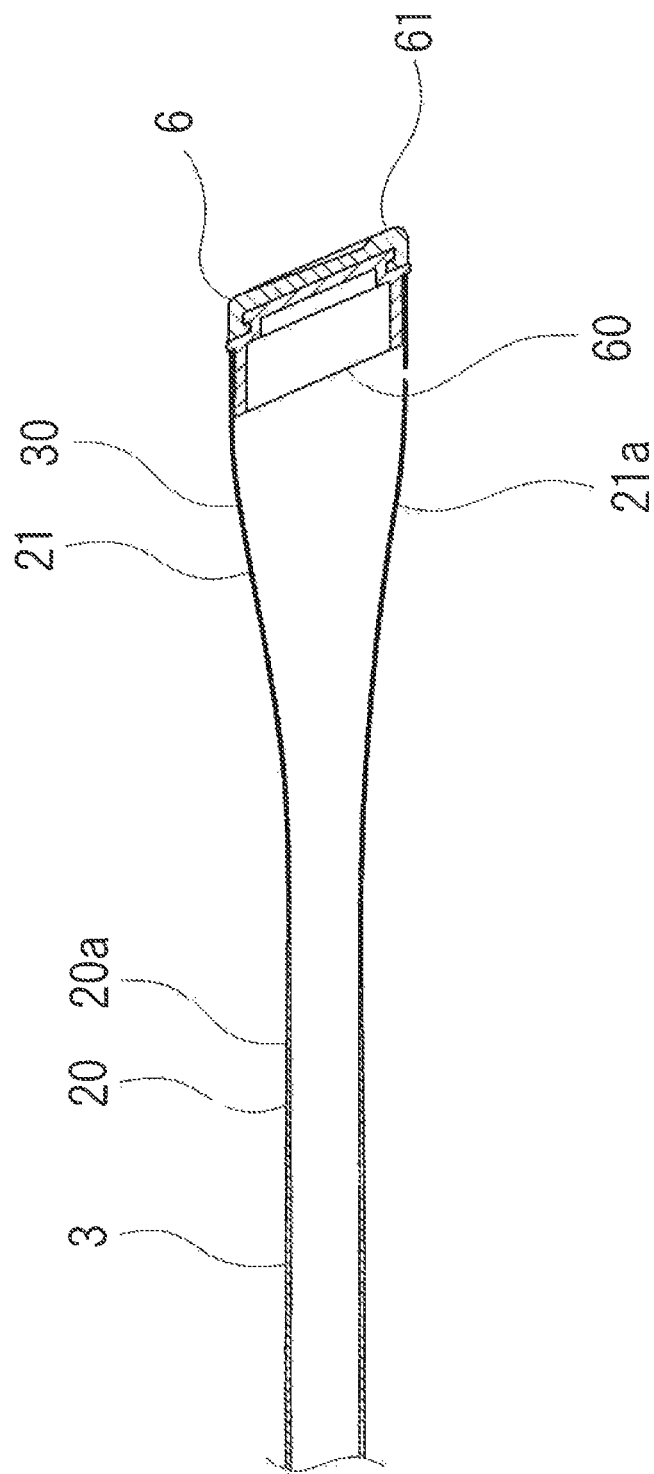
FIG. 6 is a longitudinal sectional view of the relevant part of the fishing rod.

The fishing rod has the end cap 6 on the rear end of the fishing rod. The end cap 6 is attached to the rear end portion of the second rod blank 3. The shape of the end cap 6 when viewed from the rear side corresponds to the transverse sectional shape of the rear end portion of the second rod blank 3. As shown in FIG. 5, the end cap 6 is an inverted triangle when viewed from the rear side.

The end cap 6 includes a cap main body 60 and a cover 61. The cap main body 60 is attached to the second rod blank 3 and the cover 61 is attached to the cap main body 60. The cap main body 60 is preferably made of hard synthetic resin or metal. The cover 61 is preferably softer than the cap main body 60. The cover 61 is preferably made of rubber.

It is preferable for the cap main body 60 to have a cylinder shape. As such, it is preferable for the cap main body 60 to be hollow. It is preferable that the front end of the cap main body 60 is open and the rear end of the cap main body 60 is closed. The cap main body 60 has a cylinder part 70 and an outer cylinder part 71. The cylinder part 70 is inserted inside of the rear end portion of the second rod blank 3. The transverse sectional shape of the cylinder part 70 corresponds to the transverse sectional shape of the rear end portion of the second rod blank 3. The transverse sectional shape of the cylinder part 70 is an inverted triangle. The cylinder part 70 holds the inner periphery of the rear end portion of the second rod blank 3 and prevents the rear end portion of the second rod blank 3 from being crushed and destroyed. The cylinder part 70 is a supporting section which supports the inner periphery of the rear end portion of the second rod blank 3. The cylinder part 70 is adhered to the inner periphery of the second rod blank 3. The front end surface 70a of the cylinder part 70 is inclined so that the upper side is more forward than the lower side. That is, the front end surface 70a of the cylinder part 70 is inclined similarly to the rear end surface 3a of the second rod blank 3. The front end surface 70a of the cylinder part 70 is parallel to the rear end surface 3a of the second rod blank 3. The upper portion of the front end surface 70a of the cylinder part 70 is located in front of the lower portion of the front end surface 70a of the cylinder part 70. The length of the cylinder part 70 is constant over the entire circumference. That is, the length of the portion of the end cap 6 that is inserted inside of the second rod blank 3 is constant over the entire circumference.

The outer cylinder part 71 is continuous to the rear side of the cylinder part 70. The outer cylinder part 71 projects to the rear side from the rear end portion of the second rod blank 3. A flange 72 is formed on the outer periphery of the front end of the outer cylinder part 71. The flange 72 projects outward in the radial direction. It is preferable for the flange 72 to be formed on the entire circumference of the outer cylinder part 71. The flange 72 abuts the rear end surface 3a of the second rod blank 3. Since the flange 72 abuts the rear end surface 3a of the second rod blank 3, the cap main body 60 is not inserted further into the second rod blank 3. The front surface of the flange 72 abuts the rear end surface 3a of the second rod blank 3. The front surface of the flange 72 corresponds to the inclination of the rear end surface 3a of the second rod blank 3, and is thus similarly inclined. The rear end surface 3a of the second rod blank 3 and the front surface of the flange 72 are in surface contact. The rear end surface 3a of the second rod blank 3 and the front surface of the flange 72 are parallel to each other. It is preferable that the flange 72 projects radially outward more than the outer periphery of the second rod blank 3. Since the flange 72 projects more than the outer periphery of the second rod blank 3, damage to the rear end surface 3a of the second rod blank 3 is effectively prevented. The cover 61 is attached to the outer cylinder part 71 of the cap main body 60. The cover 61 is located rearward of the flange 72. The outer periphery of the rear portion of the outer cylinder part 71 is located one step inward with respect to the outer periphery of the front portion of the outer cylinder part 71. A body convex portion 73 is formed on the outer periphery of the rear end portion of the outer cylinder part 71. The body convex portion 73 projects radially outward. It is preferable that the body convex portion 73 is formed over the entire circumference. The cover 61 is latched on the body convex portion 73.

The shape of the cover 61 corresponds to the transverse sectional shape of the rear end portion of the second rod blank 3. The cover 61 is, as shown in FIG. 5, an inverted triangle when viewed from the rear side. The cover 61 covers a portion of the outer cylinder part 71 of the cap main body 60, that is located at rear side of the flange 72. The cover 61 includes a plate-shaped part 80 and a cover cylindrical part 81 which extends from the periphery of the plate-shaped part 80 towards the front side. The plate-shaped part 80 covers the rear end surface of the outer cylinder part 71 of the cap main body 60 from the rear side. The cover cylindrical part 81 covers the outer periphery of the end portion of the outer cylinder part 71 from the outside in the radial direction. The cover projection 82 projects on the inner periphery of the cover cylindrical part 81 towards the inside in the radial direction. The cover projection 82 latches on the main body convex portion 73. Since the cover projection 82 latches on the main body convex portion 73, the cover 61 is attached to the cap main body 60. It is preferable that the flange 72 of the cap main body 60 projects radially outward more than the outer periphery of the cover cylindrical part 81. The rear surface of the plate-shaped part 80 is the rear end surface of the cover 61, the rear end surface of the end cap 6 and the rear end surface of the fishing rod. The rear end surface of the plate-shaped part 80 is inclined so that the lower side is farther rearward than the upper side.

As shown in FIG. 5, a guard wall 83 is formed on the periphery of the rear surface of the plate-shaped part 80, and projects rearward. The guard wall 83 can be formed on a part of the periphery of the rear surface of the plate-shaped part 80 or on the entire periphery. The guard wall 83 is formed at least at the lower part of the periphery of the rear surface of the plate-shaped part 80. The guard wall 83 extends along the circumferential direction, and preferably is a protrusion which extends along the circumferential direction. In this embodiment, the guard wall 83 is formed on the portion, except the upper part, of the periphery of the rear surface of the plate-shaped part 80. The rear surface of the plate-shaped part 80 is an inverted triangle, and the guard wall 83 is formed on two sides of the inverted triangle, and it not formed on a side of the upper side. Thus, the guard wall 83 has a V-shape or a U-shape when viewed from the rear side.

The projection amount of the guard wall 83 to the rear side can be constant over the entire length of the guard wall 83. However, in this embodiment, the projection amount gradually increases from the upper portion to the lower portion of the guard wall 83. The projection amount of the guard wall 83 is at a maximum at the lowermost point 83a of the guard wall 83. The width of the guard wall 83 can be constant, however, in this embodiment, the width of the guard wall 83 gradually widens from the upper portion to the lower portion of the guard wall 83. The width of the guard wall 83 is at a maximum at the lowermost point 83a of the guard wall 83.

By forming the guard wall 83 on the periphery of the rear surface of the plate-shaped part 80, the rear surface of the plate-shaped part 80 is divided into a portion where the guard wall 83 is formed and a portion where the guard wall 83 is not formed. The portion where the guard wall 83 is not formed on the rear surface of the plate-shaped part 80 is a base surface 84. The rear surface of the plate-shaped part 80 is constructed from the base surface 84 and the rear surface of the guard wall 83. The guard wall 83 is located around the base surface 84. The base surface 84 can be used as a display surface for providing a selectable display unit. That is, a display unit can be disposed on the base surface 84. The configuration of the display unit can be any suitable configuration. For example, the display unit can be formed by integrally forming irregularities on the base surface 84. The display unit can be formed by printing. A display member, such as a display board, separately attached to the base surface 84 can be the display unit. The guard wall 83 projects rearward with respect to the base surface 84, and the base surface 84 is set back to the front side in relation to the guard wall 83. The base surface 84 is recessed on the front side in relation to the guard wall 83, such that the base surface 84 is guarded by the guard wall 83.

Figure 7:
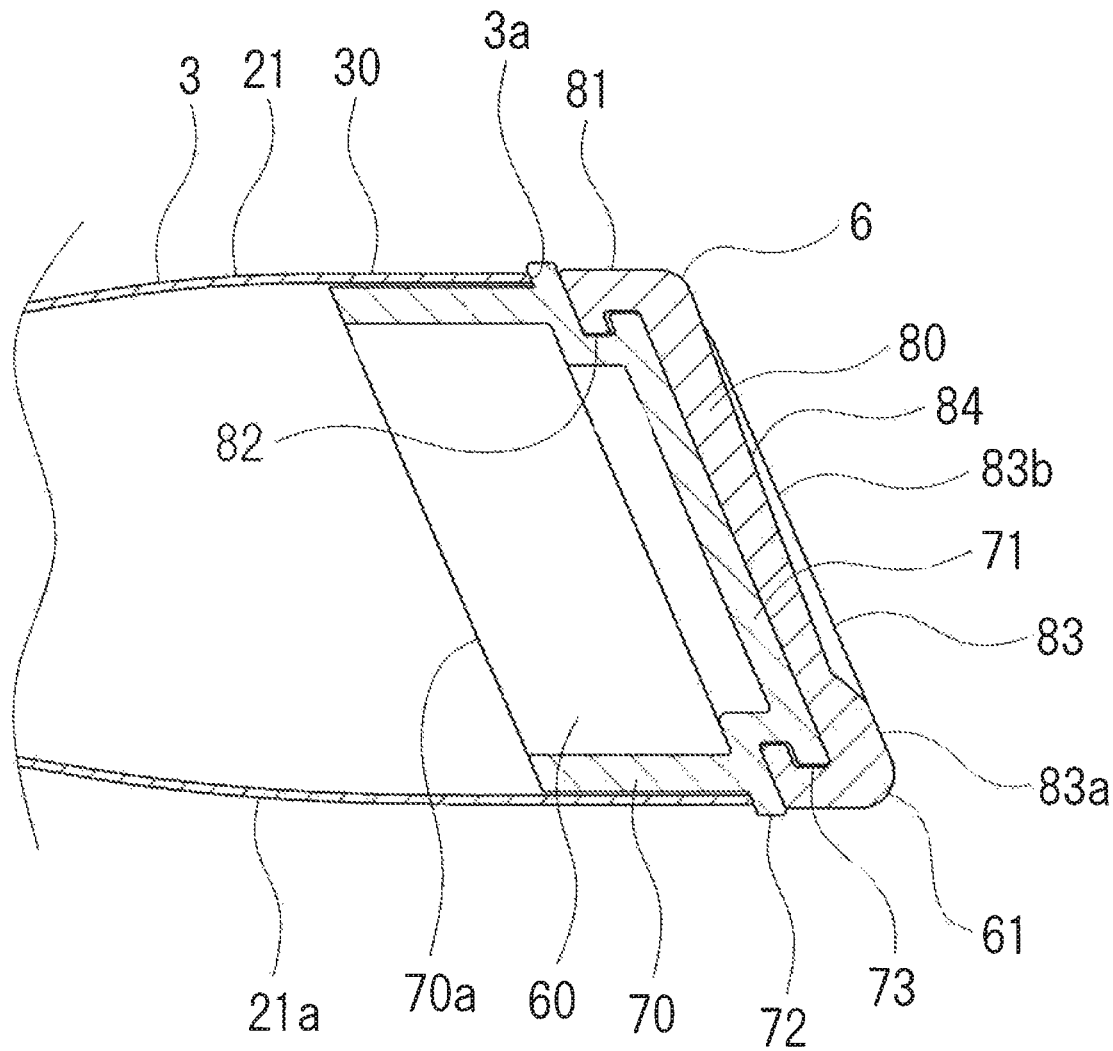
FIG. 7 is an enlarged view of the relevant part of FIG. 6.
Figure 8:
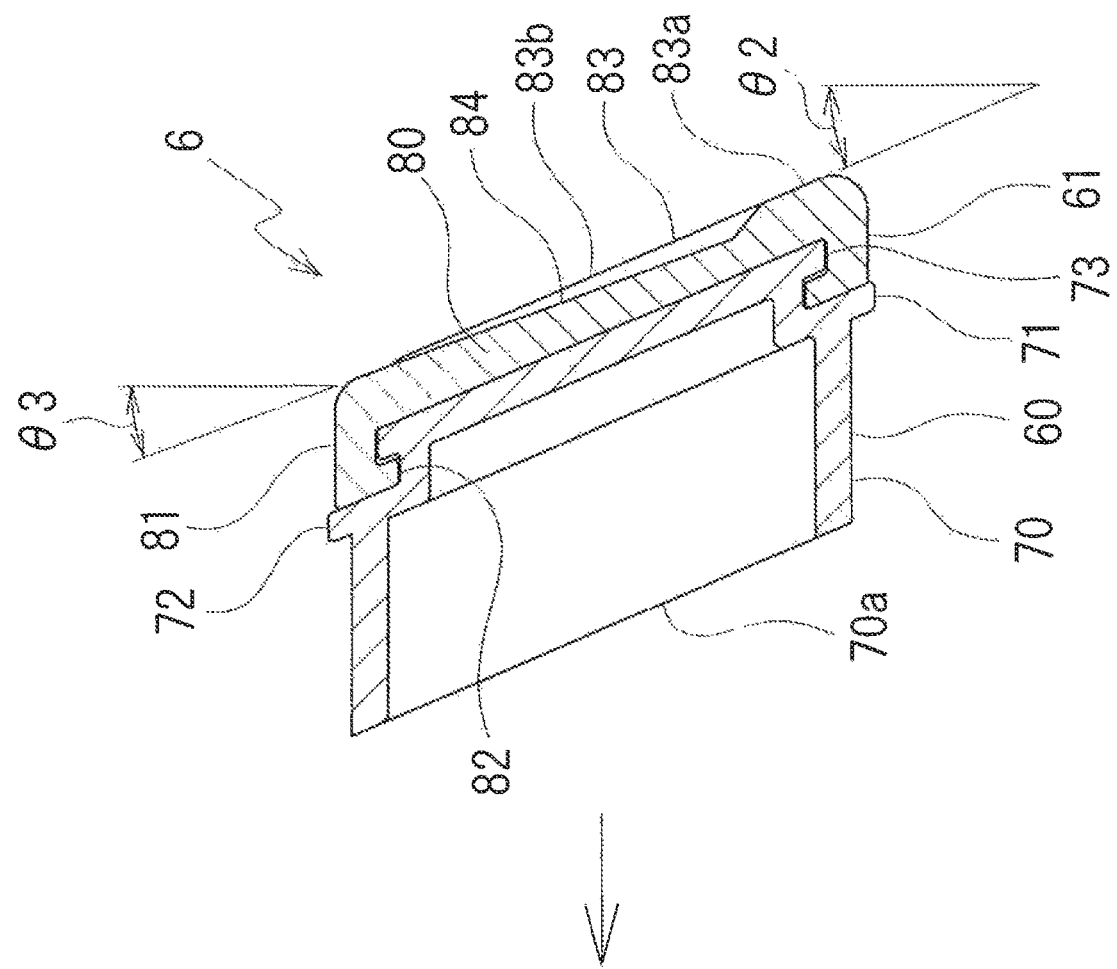
FIG. 8 is an enlarged longitudinal sectional view of the relevant part showing a state of the fishing rod in manufacturing process.
Figure 8:
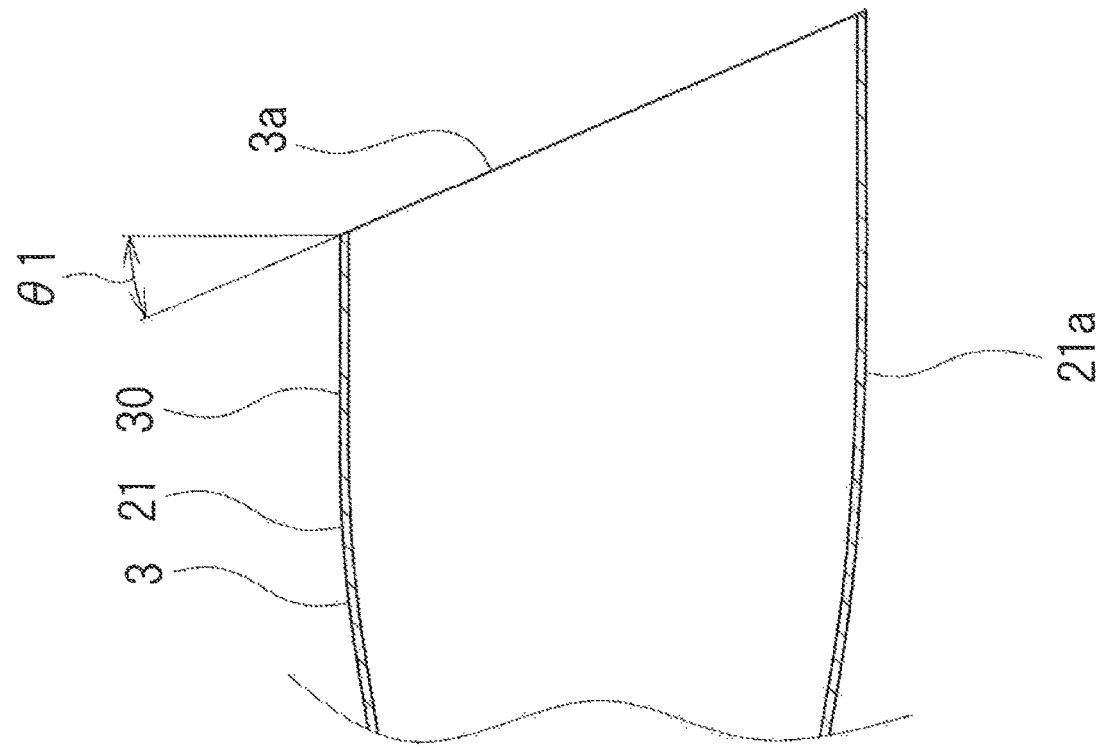

As shown in FIGS. 7 and 8, the rear surface 83b of the guard wall 83 is inclined in relation to the orthogonal surface. The inclined angle θ2 of the rear surface 83b of the guard wall 83 is the same as the inclined angle θ1 of the rear end surface 3a of the second rod blank 3. The base surface 84 is inclined at an inclination angle different from the rear surface 83b of the guard wall 83. The inclined angle θ3 of the base surface 84 is smaller than the inclined angle θ2 of the rear surface 83b of the guard wall 83. Due to the difference between these inclination angles, the guard wall 83 projects relatively rearward with regard to the base surface 84 and the projection amount of the guard wall 83 gradually increases towards the lowermost point 83a of the guard wall 83. The inclined angle θ3 of the base surface 84 is smaller than the inclined angle θ1 of the rear end surface 3a of the second rod blank 3. Meanwhile, the thickness of the portion which corresponds to the base surface 84 of the plate-shaped part 80 gradually thins towards the lowermost point of the base surface 84.

Figure 11:
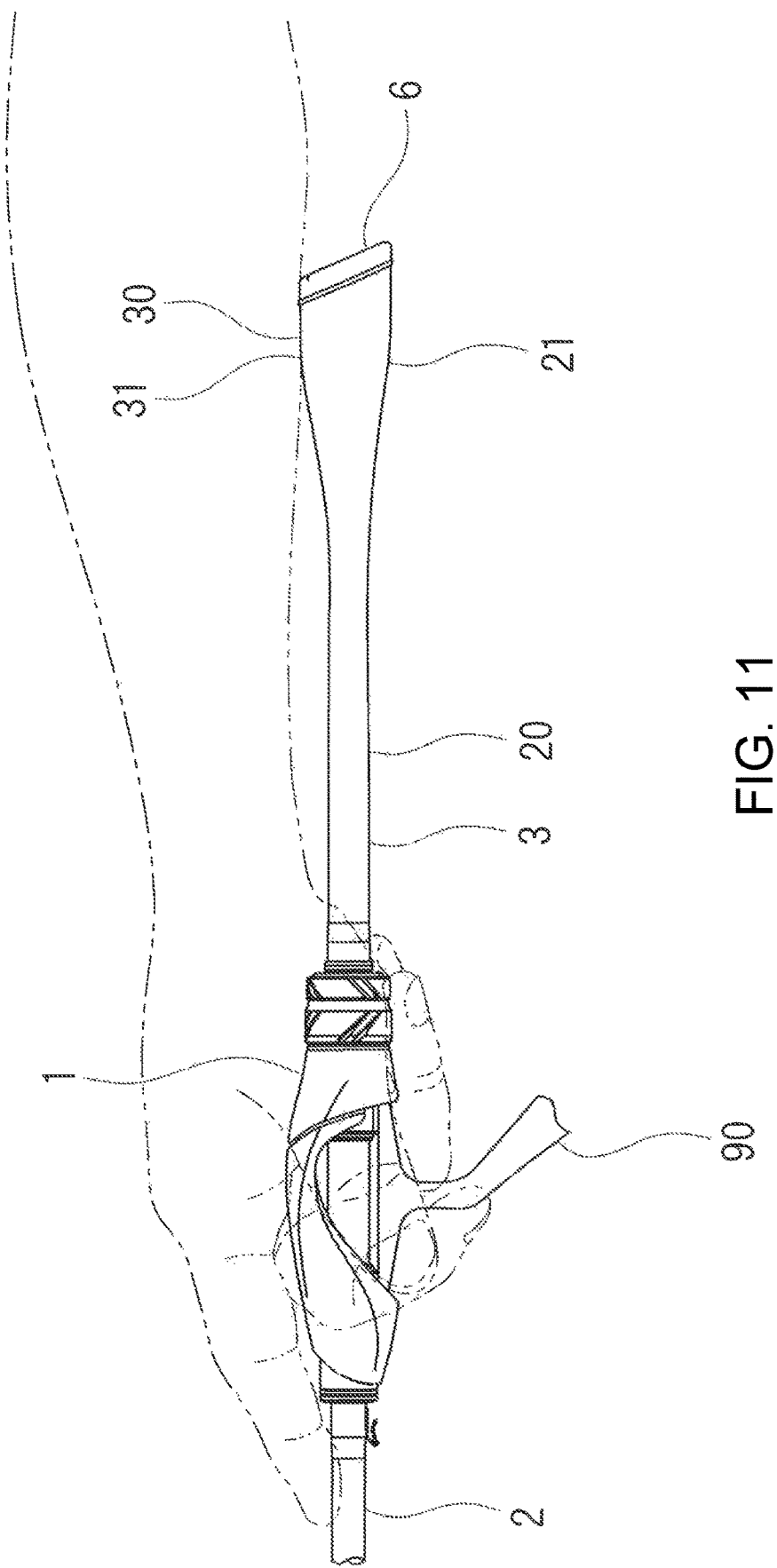
FIG. 11 is a front view of the relevant part showing a state in which the fishing rod is being used.

The spinning reel 90 is attached to the fishing rod constructed as described above, as shown in FIG. 11. The spinning reel 90 is attached to the reel mounting surface 13 of the reel seat 1. The reel mounting surface 13 is facing lower side. The spinning reel 90 is located on the lower side of the fishing rod. When the fishing rod is held with the right hand, for example, it is possible to support the fishing rod by placing the right arm on the upper surface 30. The radius of curvature of the upper surface 30 is large and the upper surface 30 is a curved surface which is close to a plane, therefore, it is possible to support the fishing rod by pressing the right arm firmly against the upper surface 30. Thus, the fishing rod is stabilized and the rotation of the fishing rod in the circumferential direction can be reduced or prevented. Additionally, since the corners 31 are disposed on both sides of the upper surface 30 respectively, the fishing rod is unlikely to rotate in the circumference direction in a state in which the right arm is placed on the upper surface 30. Additionally, the position of the upper surface 30 is easily grasped due to the pair of left and right corners 31, and thus, the right arm is easily placed on the upper surface 30. Since the right arm can be properly placed on the upper surface 30, the orientation of the fishing rod in the circumferential direction is stabilized.

The pair of corners 31 is located upper than the top 20a of the main portion 20 rearward of the rear grip portion 21. Meanwhile, the pair of corners 31 is the portion that is most distant from the centerline 4 of the main portion 20 in the radial direction, and more distant from the centerline 4 of the main portion 20 in the radial direction than the lowermost point 21a of the rear grip portion 21 in a transverse sectional view. For that reason, even if the main portion 20 of the second rod blank 3 is relatively thin, the right arm can be easily placed on the upper surface 30. Additionally, the rotation of the rear grip portion 21 in the circumferential direction can be easily suppressed by the right arm. Specifically, upward expansion amount B1 of the rear grip portion 21 is larger than the downward expansion amount B2 in the rearward of the rear grip portion 21. For that reason, even if the main portion 20 of the second rod blank 3 is relatively thin, the right arm can be easily placed on the upper surface 30.

Figure 12:
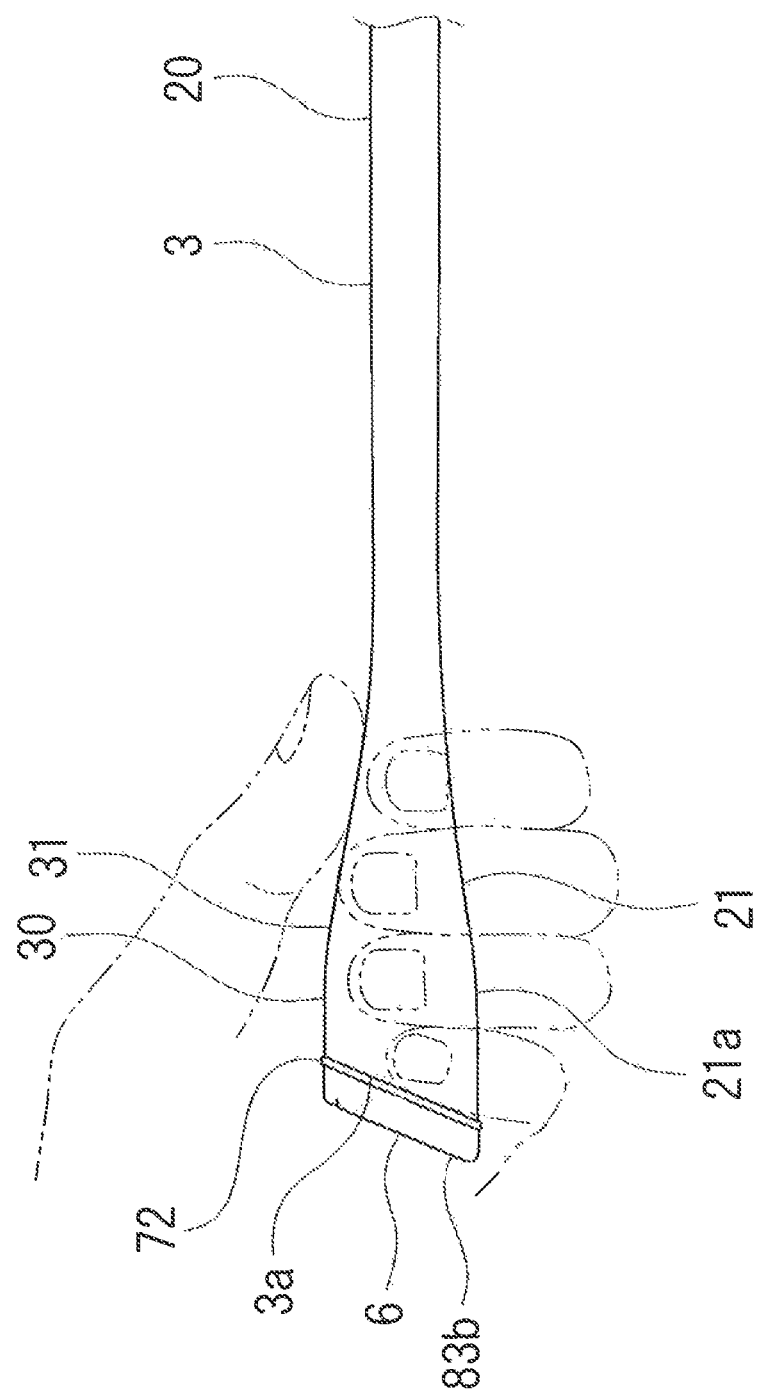
FIG. 12 is a rear view of the relevant part showing a state in which the fishing rod is being used.
Figure 13:
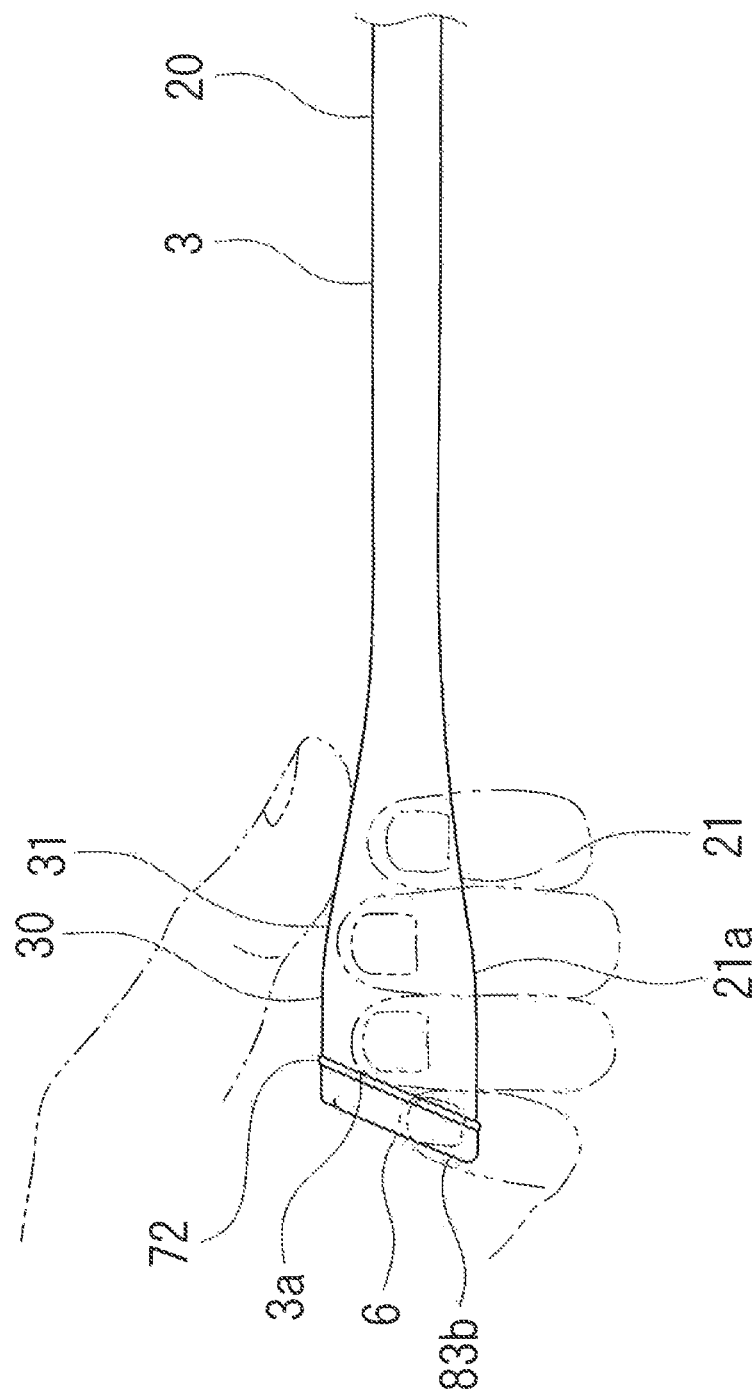
FIG. 13 is a rear view of the relevant part showing a state in which the fishing rod is being used.

When performing a double-handed casting, as shown in FIGS. 12 and 13, the rear grip portion 21 is held by a left hand. As shown in FIGS. 12 and 13, the thumb abuts against the upper surface 30. As shown in FIG. 12, four fingers, including the index finger, the middle finger, the ring finger and the little finger can contact and hold the lower portion of the rear grip portion 21. Since there is a step between the second rod blank 3 and the flange 72 of the end cap 6, the little finger can be positioned in front of the step. With the step as a catch, slippage of the little finger to rearward can be prevented. Since the transverse sectional shape of the rear grip portion 21 is an inverted triangle, the joints of the fingers, e.g., the index finger, can be positioned on the lowermost point 21a of the rear grip portion 21. Therefore, the lower portion of the rear grip portion 21 can be sandwiched from the left and right by the fingers, e.g., the index finger. Additionally, as shown in FIG. 13, it is possible that the three fingers from the index finger to the ring finger contact the lower portion of the rear grip portion 21 to lightly hold the rear grip portion 21. In this embodiment, the ring finger can be placed on the step.

In this manner, when the rear grip portion 21 is held by the left hand, it is possible to easily grasp the orientation of the fishing rod in the circumferential direction by the pair of corners 31. Also, the thumb can abut against the upper surface 30. As such, when performing double-handed casting, the fishing rod can be easily aligned in a predetermined direction and the casting can be performed accurately. Additionally, the left hand is unlikely to be displaced on the rear grip portion 21 in the circumferential direction due to the corners 31. Thus, it is possible to hold the rear grip portion and to cast with a small force.

The rear end surface 3a of the second rod blank 3 is inclined so that the lower side is farther rearward than the upper side and the lowermost point 21a of the rear grip portion 21 extends farther rearward than the upper surface 30. Therefore, even if the length of the rear grip portion 21 is short, it is possible to place many fingers on the lowermost point 21a of the rear grip portion 21. Meanwhile, by making the rear grip portion 21 short, it is possible to reduce the weight of the rear grip portion 21, and thus, the weight of the fishing rod can be reduced.

The rear surface 83b of the guard wall 83 of the end cap 6 is inclined so that the lower side is farther rearward than the upper side. As such, the fishing rod can be smoothly inserted into a rod holder or a fishing rod bag. Additionally, the end cap 6 is an inverted triangle and the end cap 6 thins towards the lowermost point of the end cap 6. That is, the lowermost point of the end cap 6 has a sharply pointed shape which is slanted towards the rear side and the lower side. As such, the rear end portion of the fishing rod can be smoothly inserted into the rod holder or the fishing rod bag. Also, since the rear surface 83b of the guard wall 83 of the end cap 6 is inclined, it is possible to easily grasp the orientation of the fishing rod in the circumferential direction.

The projection amount of the guard wall 83 gradually increases towards the lower side and is at a maximum at the lowermost point 83a of the guard wall 83, and thus, the guard wall 83 can effectively protect the lowermost point of the rear end surface 3a of the second rod blank 3. Also, the lowermost point of the end cap 6 can be effectively protected by the guard wall 83. The width of the guard wall 83 gradually widens towards the lower side and is at a maximum at the lowermost point 83a of the guard wall 83, and thus, the guard wall 83 can effectively protect the lowermost point of the rear end surface 3a of the second rod blank 3 and the lowermost point of the end cap 6.

The inclined angle θ3 of the base surface 84 is smaller than the inclined angle θ2 of the rear surface 83b of the guard wall 83, therefore, the projection amount of the guard wall 83 can be easily increased towards the lower side without excessively increasing the thickness. The front end surface 70a of the cylinder part 70 of the end cap 6 is inclined so that the lower side is farther rearward than the upper side, and thus, the weight of the cylinder part 70 can be reduced while the cylinder part 70 holds the second rod blank 3.

Figure 14A:
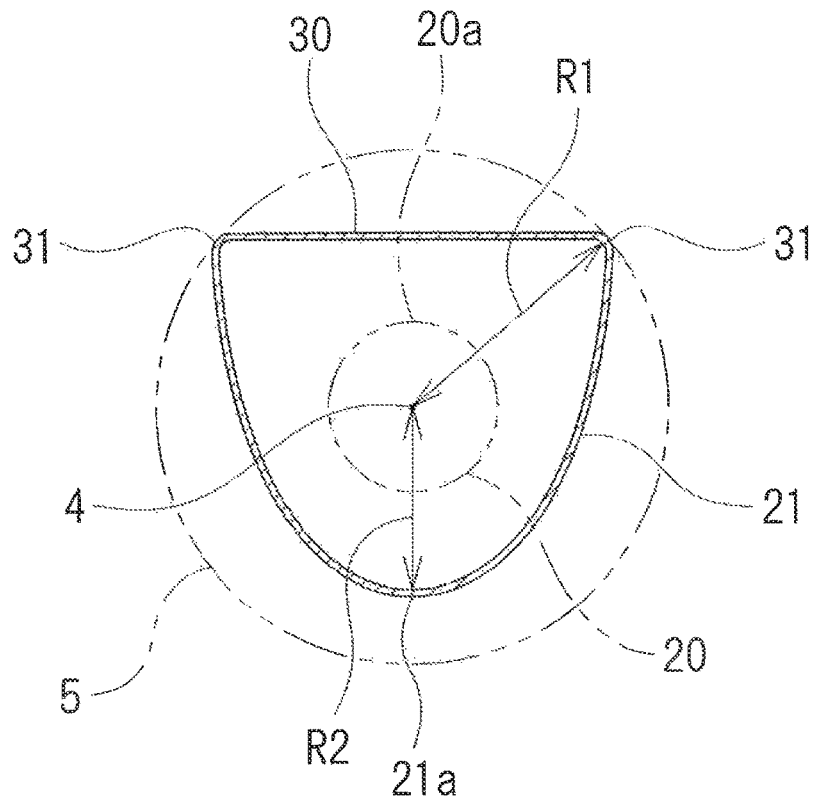
FIGS. 14A and 14B are end elevational views that correspond to FIG. 10B, illustrating additional embodiments of fishing rods according to the present invention.
Figure 14B:
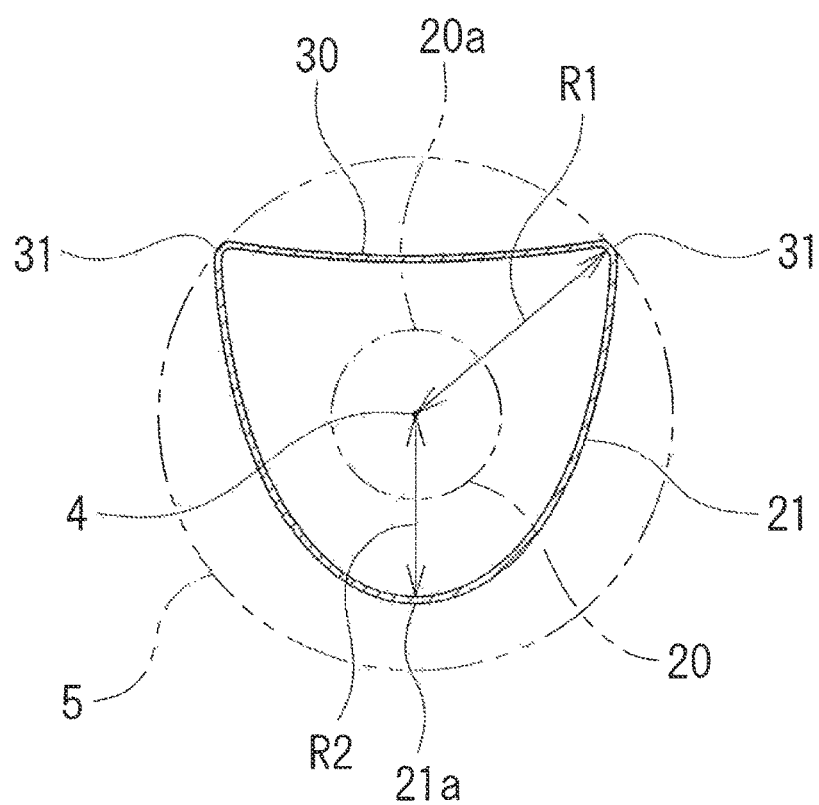

Meanwhile, as shown in FIG. 14A, the upper surface 30 can have a flat shape which does not curve along the circumferential direction in the cross-sectional view. Also, as shown in 14B, the upper surface 30 can have a shape which is recessed towards radially inside. That is, the upper surface 30 can be a recessed curved surface which curves towards radially inside along the circumferential direction.

Figure 15:
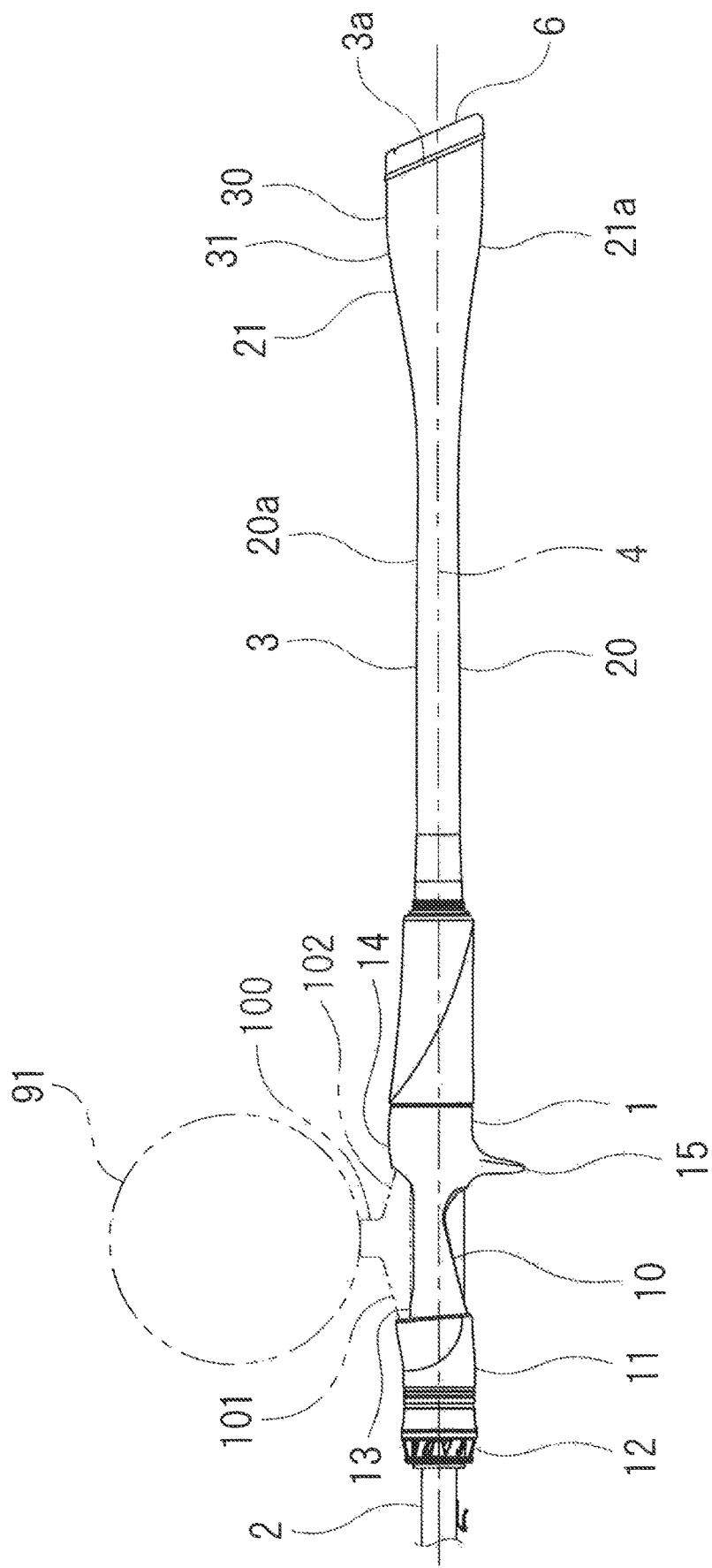
FIG. 15 is a front view showing the relevant part of the fishing rod in another embodiment of the present invention.

Also, as shown in FIG. 15, it can be a fishing rod which is suitable for attaching a double bearing reel 91. In this embodiment, the reel mounting surface 13 faces upward and the double bearing reel 91 is positioned on the upside of the fishing rod. In this embodiment, the reel mounting surface 13 side is the upside and the radially opposite side of the reel mounting surface 13 is the downside. The reel seat 1 includes a trigger 15 for hooking a finger. The trigger 15 is located on the opposite side of the reel mounting surface 13. The trigger 15 projects towards the downside. With the double bearing reel 91, the upside is the reel mounting side and the downside is the radially opposite side of the reel mounting side.

What is claimed is:

1. A fishing rod having a rod blank which is configured to be attached to a fishing reel on a lower side, comprising:
   the rod blank including a cylindrical main portion and a rear grip portion that continuously increasingly expands from a rod end side of the main portion, the rod blank being a single rod blank so that an outer surface of the rear grip portion being continuously smooth along an entirety of a peripheral length thereof, the rear grip portion being wound prepreg so as to be hollow with an inner surface defining a same cross section shape as an outer surface along at least a portion configured to be held with a hand, and
   the rear grip portion including a corner portion which is located radially outward and higher relative to an outer perimeter of the main portion, the corner portion being farther from a center of the main portion in a radial direction than a lowermost point of the rear grip portion in a transverse sectional view along at least a majority of the rear grip portion, and the rear grip portion having an upper surface that continuously increases in radius of curvature from a front portion of the rear grip portion to a rear portion of the rear grip portion in a rearward direction, so as to have a first radius of curvature adjacent a front end of the rear grip portion and a second radius of curvature adjacent the rear end of the rear grip portion,
   the second radius of curvature being larger than the first radius of curvature,
   the rear grip portion having an upward expansion amount and a downward expansion amount,
   the upward expansion amount being a radial distance from the center of the main portion to an uppermost point on the upper surface,
   the downward expansion amount being a radial distance from the center of the main portion to a lowermost point on a lower surface opposite the upper surface,
   the upward expansion amount increases in size relative to the downward expansion amount along the rear portion of the rear grip portion from the cylindrical main portion towards the rear end of the rear grip portion, such that the upward expansion amount is larger than a downward expansion amount.

2. The fishing rod according to claim 1, wherein
   the corner portion includes at least a first corner and a second corner, and the upper surface is on an upper side of a circumference between the first corner and the second corner, and the lower surface which is on a lower side of the circumference between the first corner and the second corner,
   the second radius of curvature is different than a radius of curvature of the lower surface in the transverse sectional view, and
   a width, as measured from the first corner to the second corner increases from the front portion of the rear grip portion to the rear of the rear grip portion.

3. The fishing rod according to claim 2, wherein
   the second radius of curvature of the upper surface in the circumferential direction is larger than the radius of curvature of the lower surface in the circumferential direction.

4. The fishing rod according to claim 3, wherein
   the second radius of curvature of the upper surface in the circumferential direction is larger than the radius of a virtual circle passing the first corner and the second corner, with the center of the main portion as a center of the virtual circle.

5. The fishing rod according to claim 1, wherein
   an end surface of the rod blank on the rod end side is inclined so that a lower side extends more towards the rod end side than an upper side.

6. The fishing rod according to claim 1, wherein
   the upper surface is disposed at a larger distance from a center line of the main portion than the lower surface, at least in a portion at the rod end side.

7. The fishing rod according to claim 1, further comprising
   an end cap attached to an end portion of the rod blank at the rod end side, and
   an end surface of the end cap is inclined so that the lower side extends farther in the rearward direction of the rod end side than the upper surface.

8. The fishing rod according to claim 7, wherein
   the end cap has a guard wall which projects to the rod end side at least in a lower portion of a periphery of the end surface of the end cap, and
   a projection amount of the guard wall gradually increases towards the lower side.

9. The fishing rod according to claim 8, wherein
   the end cap has a cylinder part which is inserted into the rod blank, and a front end surface of the cylinder part is inclined so that the lower side extends farther in the rearward direction of the rod end side than the upper surface extends.

10. The fishing rod according to claim 1, wherein
the corner portion includes a corner, and the radius of curvature of the upper surface in the circumferential direction is larger than a radius of a virtual circle passing the corner, with the center of the main portion as a center of the virtual circle.

11. The fishing rod according to claim 1, wherein the corner portion is located radially outward relative to the outer perimeter of the main portion and farther from the center of the main portion in the radial direction than the lowermost point of the rear grip portion in the transverse sectional view is disposed along an entirety of the rear grip portion.

12. The fishing rod according to claim 1, wherein the corner portion is a first corner portion of two corner portions and the upper surface is arcuate between the two corner portions.

13. A fishing rod having a rod blank which is configured to be attached to a fishing reel on an upper side, comprising:
the rod blank including a cylindrical main portion and a rear grip portion that continuously increasingly expands from a rod end side of the main portion, the rod blank being a single rod blank so that an outer surface of the rear grip portion being continuously smooth along an entirety of a peripheral length thereof, the rear grip portion being wound prepreg so as to be hollow with an inner surface defining a same cross section shape as an outer surface along at least a portion configured to be held with a hand, and
the rear grip portion including a corner portion which is located higher than an outer perimeter of the main portion, the corner portion being farther apart from a center of the main portion in a radial direction than a lowermost point of the rear grip portion in a transverse sectional view along at least a majority of the rear grip portion, and the rear grip portion having an upper surface, the upper surface continuously increasing in radius of curvature from a front portion of the rear grip portion to a rear portion of the rear grip portion in a rearward direction, so as to have a first radius of curvature adjacent a front end of the rear grip portion and a second radius of curvature adjacent the rear end of the rear grip portion,
the second radius of curvature being larger than the first radius of curvature,
the rear grip portion having an upward expansion amount and a downward expansion amount,
the upward expansion amount being a radial distance from the center of the main portion to an uppermost point on the upper surface,
the downward expansion amount being a radial distance from the center of the main portion to a lowermost point on a lower surface opposite the upper surface,
the upward expansion amount increases in size relative to the downward expansion amount along the rear portion of the rear grip portion from the cylindrical main portion towards the rear end of the rear grip portion, such that the upward expansion amount is larger than a downward expansion amount.

14. The fishing rod according to claim 13, wherein
the corner portion includes at least a first corner and a second corner, and the upper surface which is on an upper side of a circumference between the first corner and the second corner, and the lower surface which is on a lower side of the circumference between the first corner and the second corner,
the second radius of curvature is different than a radius of curvature of the lower surface in the transverse sectional view, and
a width, as measured from the first corner to the second corner increases from the front portion of the rear grip portion to the rear of the rear grip portion.

15. The fishing rod according to claim 14, wherein
the second radius of curvature of the upper surface in the circumferential direction is larger than the radius of curvature of the lower surface in the circumferential direction.

16. The fishing rod according to claim 14, wherein
the second radius of curvature of the upper surface in the circumferential direction is larger than the radius of a virtual circle passing the first corner and the second corner, with the center of the main portion as a center of the virtual circle.

17. The fishing rod according to claim 13, wherein
an end surface of the rod blank on the rod end side is inclined so that a lower side extends more toward the rod end side than an upper side.

18. The fishing rod according to claim 13, wherein
the upper surface is disposed at a larger distance from a center line of the main portion than the lower surface, at least in a portion at the rod end side.

19. The fishing rod according to claim 13, further comprising
an end cap attached to an end portion of the rod blank at the rod end side, and
an end surface of the end cap is inclined so that the lower side extends farther in the rearward direction of the rod end side than the upper surface.

20. The fishing rod according to claim 19, wherein
the end cap has a guard wall which projects to the rod end side at least in a lower portion of a periphery of the end surface of the end cap, and
a projection amount of the guard wall gradually increases towards the lower side.

21. The fishing rod according to claim 19, wherein
the end cap has a cylinder part which is inserted into the rod blank, and
a front end surface of the cylinder part is inclined so that the lower side extends farther in the rearward direction of the rod end side than the upper surface.

22. The fishing rod according to claim 13, wherein
the corner portion includes a corner, and the radius of curvature of the upper surface in the circumferential direction is larger than a radius of a virtual circle passing the corner, with the center of the main portion as a center of the virtual circle.

23. The fishing rod according to claim 13, wherein the corner portion is located radially outward relative to the outer perimeter of the main portion and farther from the center of the main portion in the radial direction than the lowermost point of the rear grip portion in the transverse sectional view is disposed along an entirety of the rear grip portion.

24. The fishing rod according to claim 13, wherein the corner portion is a first corner portion of two corner portions and the upper surface is arcuate between the two corner portions.

* * * * *